US010656907B2

(12) United States Patent
Seolas et al.

(10) Patent No.: US 10,656,907 B2
(45) Date of Patent: May 19, 2020

(54) TRANSLATION OF NATURAL LANGUAGE INTO USER INTERFACE ACTIONS

(71) Applicant: OBSERVEPOINT, INC., Provo, UT (US)

(72) Inventors: Robert K. Seolas, Alpine, UT (US); John Raymond Pestana, Orem, UT (US); Tyler Broadbent, Lehi, UT (US); Gregory Larson, Orem, UT (US); Alan Martin Feurelein, Orem, UT (US)

(73) Assignee: OBSERVEPOINT INC., Provo, UT (US)

( * ) Notice: Subject to any disclaimer, the term of this patent is extended or adjusted under 35 U.S.C. 154(b) by 251 days.

(21) Appl. No.: 14/912,011

(22) PCT Filed: Nov. 3, 2015

(86) PCT No.: PCT/US2015/058829
§ 371 (c)(1),
(2) Date: Feb. 12, 2016

(87) PCT Pub. No.: WO2017/078686
PCT Pub. Date: May 11, 2017

(65) Prior Publication Data
US 2017/0255445 A1  Sep. 7, 2017

(51) Int. Cl.
*G06F 3/16* (2006.01)
*G06F 3/048* (2013.01)
(Continued)

(52) U.S. Cl.
CPC .............. *G06F 3/167* (2013.01); *G06F 3/048* (2013.01); *G06F 3/0481* (2013.01);
(Continued)

(58) Field of Classification Search
CPC .......... G06F 3/167; G06F 9/451; G06F 3/048; G06F 3/0481; G06F 3/0484; G06F 8/38; G06F 17/279; G06F 17/28
See application file for complete search history.

(56) References Cited

U.S. PATENT DOCUMENTS

| 6,792,458 B1 | 9/2004 | Muret |
| 6,804,701 B2 | 10/2004 | Muret |

(Continued)

FOREIGN PATENT DOCUMENTS

| WO | 2015035193 | 3/2015 |
| WO | 2017078686 | 5/2017 |

OTHER PUBLICATIONS

International Search Report for application No. PCT/US2015/058829 dated Aug. 2, 2016.

(Continued)

*Primary Examiner* — Anil N Kumar
(74) *Attorney, Agent, or Firm* — Workman Nydegger

(57) ABSTRACT

Embodiments are directed to methods and systems for deriving automation instructions. In one scenario, a computer system derives automation instructions by performing the following: rendering a user interface (UI) based on information from an information source and receiving natural language inputs from a user, where the natural language inputs specify an element description and an action type for UI elements rendered in the UI. The method also includes identifying UI elements in the UI that match the element descriptions in the natural language input and whose actions are performable according to their specified action type, and mapping the natural language inputs into executable code using information that corresponds to the identified UI elements.

14 Claims, 5 Drawing Sheets

(51) Int. Cl.
  *G06F 17/27* (2006.01)
  *G06F 9/451* (2018.01)
  *G06F 8/38* (2018.01)
  *G06F 3/0484* (2013.01)
  *G06F 3/0481* (2013.01)
  *G06F 17/28* (2006.01)

(52) U.S. Cl.
  CPC .............. *G06F 3/0484* (2013.01); *G06F 8/38* (2013.01); *G06F 9/451* (2018.02); *G06F 17/279* (2013.01); *G06F 17/28* (2013.01)

(56) References Cited

U.S. PATENT DOCUMENTS

| | | | |
|---|---|---|---|
| 7,177,798 B2 | 2/2007 | Hsu et al. | |
| 7,610,289 B2 | 10/2009 | Muret | |
| 7,849,202 B2 | 12/2010 | Muret | |
| 7,983,455 B2 | 7/2011 | Moise | |
| 8,032,564 B2 | 10/2011 | Muret | |
| 8,150,983 B2 | 4/2012 | Muret | |
| 8,261,362 B2 | 9/2012 | Goodwin | |
| 8,429,243 B1 | 4/2013 | Wang | |
| 8,510,668 B1 | 8/2013 | Raskin | |
| 8,516,601 B2 | 8/2013 | Goodwin | |
| 8,554,804 B2 | 10/2013 | Muret | |
| 8,640,037 B2 | 1/2014 | Goodwin | |
| 8,683,051 B2 | 3/2014 | Muret | |
| 8,683,056 B2 | 3/2014 | Muret | |
| 8,706,477 B1 * | 4/2014 | Diaconescu | G06F 17/271 704/2 |
| 8,805,946 B1 | 8/2014 | Gommen | |
| 8,812,317 B2 * | 8/2014 | Jang | G10L 15/065 704/244 |
| 8,843,827 B2 | 9/2014 | Koo | |
| 8,904,278 B1 | 12/2014 | Anderson | |
| 8,907,932 B2 | 12/2014 | Rusu | |
| 8,990,298 B1 | 3/2015 | Anderson | |
| 8,996,986 B2 | 3/2015 | Manion | |
| 8,997,081 B1 | 3/2015 | Manion | |
| 9,003,552 B2 | 4/2015 | Goodwin | |
| 9,081,789 B2 | 7/2015 | Anderson | |
| 9,116,608 B2 | 8/2015 | Koo | |
| 9,165,308 B2 | 10/2015 | Cook | |
| 9,185,016 B2 | 11/2015 | Muret | |
| 9,203,905 B1 | 12/2015 | Hong | |
| 9,219,787 B1 | 12/2015 | Manion | |
| 9,601,113 B2 * | 3/2017 | Anandarajah | G10L 15/22 |
| 2003/0033152 A1 | 2/2003 | Cameron | |
| 2003/0158736 A1 | 8/2003 | James et al. | |
| 2008/0114875 A1 | 5/2008 | Anastas | |
| 2008/0152202 A1 | 6/2008 | Moise | |
| 2009/0287713 A1 | 11/2009 | Anderson | |
| 2012/0166477 A1 | 6/2012 | Arrouye et al. | |
| 2012/0212459 A1 | 8/2012 | Rusu | |
| 2013/0290480 A1 | 10/2013 | Manion | |
| 2013/0297775 A1 | 11/2013 | Hong | |
| 2013/0297776 A1 | 11/2013 | Hong | |
| 2013/0297777 A1 | 11/2013 | Hong | |
| 2013/0297778 A1 | 11/2013 | Hong | |
| 2014/0041048 A1 | 2/2014 | Goodwin | |
| 2014/0089782 A1 | 3/2014 | Cook | |
| 2014/0137006 A1 | 5/2014 | Goodwin | |
| 2014/0156738 A1 | 6/2014 | Muret | |
| 2014/0208216 A1 | 7/2014 | Koo | |
| 2014/0380286 A1 * | 12/2014 | Gabel | G06F 8/20 717/139 |
| 2015/0019227 A1 * | 1/2015 | Anandarajah | G10L 15/22 704/257 |
| 2015/0066587 A1 | 3/2015 | Gommen | |
| 2015/0213282 A1 | 7/2015 | Goodwin | |
| 2015/0295988 A1 | 10/2015 | Goodwin | |
| 2016/0004673 A1 | 1/2016 | Cook | |

OTHER PUBLICATIONS

Non-Final Office Action for U.S. Appl. No. 14/912,011 dated Feb. 26, 2018.

* cited by examiner

TRANSLATION OF NATURAL LANGUAGE INTO USER INTERFACE ACTIONS

CROSS-REFERENCE TO RELATED APPLICATIONS

The present invention is a 35 U.S.C. § 371 U.S. National Stage of PCT PCT/US15/58829, filed Nov. 3, 2015, the entire content of which is incorporated herein by reference.

BACKGROUND OF THE INVENTION

1. The Field of the Invention

This invention relates to systems, methods, and computer program products related to translating natural language into user interface actions.

2. Background and Relevant Art

Mobile devices, such as tablet computers and smart phones, have experienced explosive growth and market penetration in recent years. Accompanying this growth, the mobile application market has also experienced tremendous growth. Mobile applications can range from simple games to complex productivity software. In many cases, regardless of the type of mobile application, the mobile application communicates through the Internet to various servers. The servers can be used to store user created content, provide additional features, allow a developer to track software and user behavior, or provide other similar services.

In some cases, mobile applications may act as a web portal to a webpage. Using the mobile application, a user may navigate the webpage's content. In some conventional systems, the mobile application may provide a user experience that is very similar to the user experience provided through a general purpose mobile web browser.

Similar to web pages that are accessed through conventional computer-based web browsers, the content viewable by the mobile application may comprise various pieces of code, sometimes referred to as "tags," that are configured to execute (i.e., "fire") when the content is viewed. In at least one conventional form, a tag is a hidden element within a webpage that causes some action to occur on a webpage when it is fired. In particular, in at least one implementation, a tag is a piece of code that a webpage owner can place within a webpage, and allows the webpage owner to track information about the visitors who download and execute the particular piece of code.

For example, a tag can comprise a transparent GIF or a tracking pixel, which is placed within the code of a webpage. The actual transparent GIF or tracking pixel can be stored on a separate server from the actual webpage. The tag is fired when the browser requests the transparent GIF or tracking pixel from the separate server. When the separate server receives the request from the browser, the server can gather various analytic data about the requestor.

Once executed, a tag can gather information such as where the visitor came from (e.g., what webpage or search engine), what keywords were used to find the webpage, whether a particular advertisement directed a visitor to the page, and other related data. In many situations, a webpage can comprise multiple tags from a variety of different parties. For example, a particular webpage may contain a Google Analytics tag, a Facebook tag, a pagecounter tag, a weather tag, and other common tags. In at least one implementation, a tag can merely comprise a particular call to an external advertising server.

As mobile applications have become more pervasive and as more users have begun to access web-based content through custom mobile applications, content providers have also become more interested in ensuring that the various tags embedded within their web content are operating correctly within the mobile applications. In many cases, large amounts of advertising money are dependent upon tags correctly tracking visitors to a website. Keeping proper track of these tags, however, presents several unique challenges.

For example, due to the tremendous variety of mobile applications it is much more difficult to create a "standard" test environment. Additionally, many organizations create a mobile version of their web content, such that audits of their conventional web-based content do not necessarily correlate to audits of their mobile content. Furthermore, some applications have begun to allow use of voice interaction. For instance, some mobile applications allow users to provide certain specified voice commands that, when acted upon, cause the mobile application to perform a given task.

Determining which tasks are intended, however, especially when the user provides verbal input other than a specified command (e.g. a natural language input), is very problematic. Still further, determining which UI elements are to be involved in the action is not a straightforward process.

BRIEF SUMMARY OF THE INVENTION

Embodiments described herein are directed to methods and systems for deriving automation instructions. In one embodiment, a computer system derives automation instructions by performing the following: rendering a user interface (UI) based on information from an information source and receiving natural language inputs from a user, where the natural language inputs specify an element description and an action type for UI elements rendered in the UI. The method also includes identifying UI elements in the UI that match the element descriptions in the natural language input and whose actions are performable according to their specified action type, and mapping the natural language inputs into executable code using information that corresponds to the identified UI elements.

In another embodiment, a computer system performs an alternative method for deriving automation instructions. The method includes rendering a user interface (UI) based on information from an information source and receiving natural language inputs from a user, where the natural language inputs include an action type and an element description for UI elements rendered in the UI. The method further includes identifying UI elements in the UI that match the element descriptions in the natural language input and are performable according to their specified action type. The method next includes mapping the natural language inputs into executable code using information corresponding to the identified UI elements, executing the executable code generated from the mapped natural language inputs, determining that actions performed as a result of executing the executable code executed actions did not function as expected, implementing a secondary, different action and determining that the secondary, different action functioned as expected.

In another embodiment, a computer system is provided. The computer system includes at least one hardware processor. The computer system further includes a renderer configured to render a user interface (UI) based on information from an information source and a natural language input receiver configured to receive natural language inputs from a user that include an action type and an element description for UI elements rendered in the UI. The computer system also includes an identifying module configured to identify UI elements in the UI that match the element descriptions in the natural language input and are performable according to their specified action type. Also included in the computer system is a natural language mapping module configured to map the natural language inputs into executable code using information corresponding to the identified UI elements.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION OF THE PREFERRED EMBODIMENTS

Figure 1:
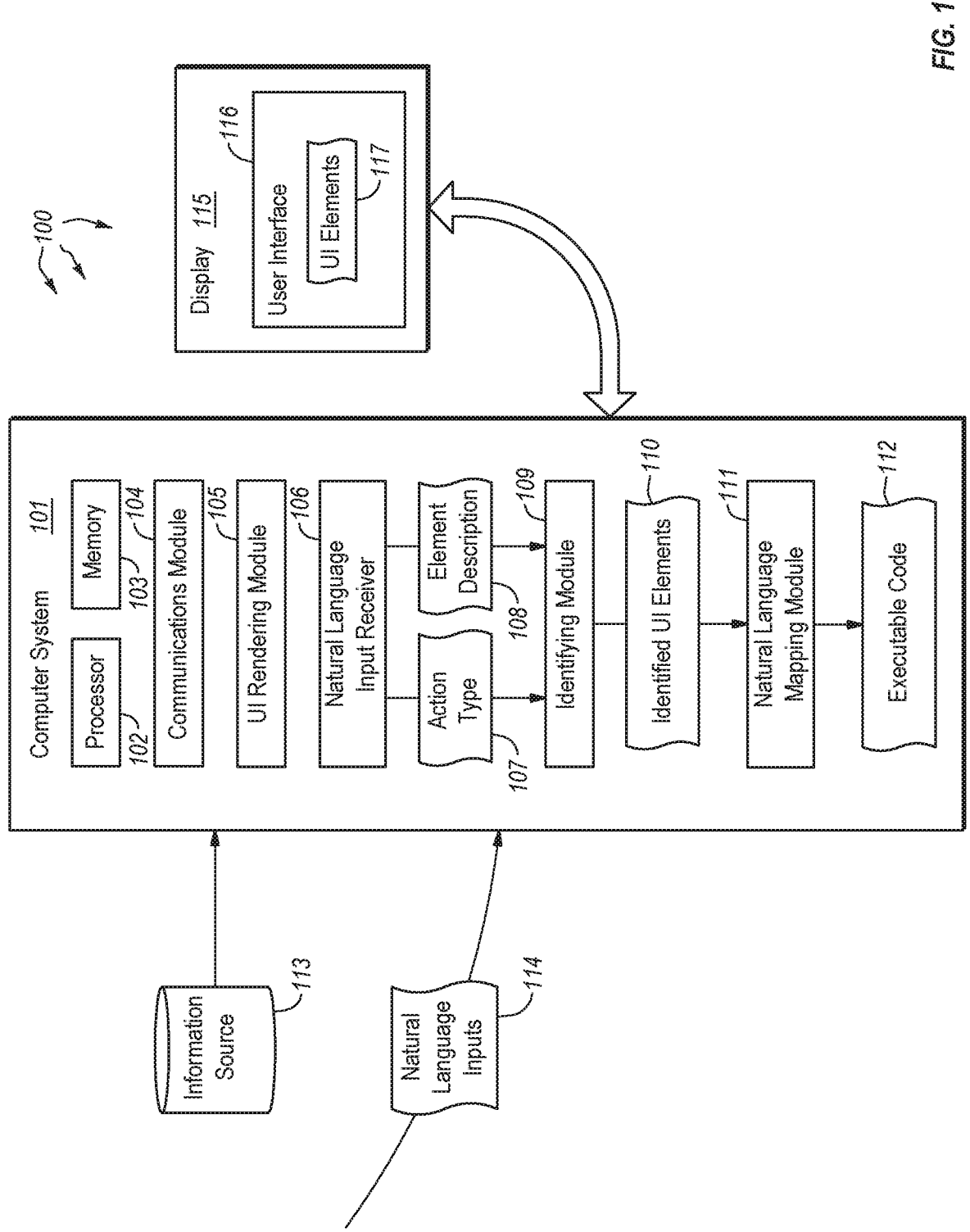
FIG. 1 illustrates a computer architecture in which embodiments described herein may operate including deriving automation instructions.

Embodiments described herein are directed to methods and systems for deriving automation instructions. In one embodiment, a computer system derives automation instructions by performing the following: rendering a user interface (UI) based on information from an information source and receiving natural language inputs from a user, where the natural language inputs specify an element description and an action type for UI elements rendered in the UI. The method also includes identifying UI elements in the UI that match the element descriptions in the natural language input and whose actions are performable according to their specified action type, and mapping the natural language inputs into executable code using information that corresponds to the identified UI elements.

In another embodiment, a computer system performs an alternative method for deriving automation instructions. The method includes rendering a user interface (UI) based on information from an information source and receiving natural language inputs from a user, where the natural language inputs include an action type and an element description for UI elements rendered in the UI. The method further includes identifying UI elements in the UI that match the element descriptions in the natural language input and are performable according to their specified action type. The method next includes mapping the natural language inputs into executable code using information corresponding to the identified UI elements, executing the executable code generated from the mapped natural language inputs, determining that actions performed as a result of executing the executable code executed actions did not function as expected, implementing a secondary, different action and determining that the secondary, different action functioned as expected.

In another embodiment, a computer system is provided. The computer system includes at least one hardware processor. The computer system further includes a renderer configured to render a user interface (UI) based on information from an information source and a natural language input receiver configured to receive natural language inputs from a user that include an action type and an element description for UI elements rendered in the UI. The computer system also includes an identifying module configured to identify UI elements in the UI that match the element descriptions in the natural language input and are performable according to their specified action type. Also included in the computer system is a natural language mapping module configured to map the natural language inputs into executable code using information corresponding to the identified UI elements.

The following discussion refers to a number of methods and method acts that may be performed by one or more embodiments of the subject matter disclosed herein. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may implement various types of computing systems. These computing systems are now increasingly taking a wide variety of forms. Computing systems may, for example, be mobile phones, electronic appliances, laptop computers, tablet computers, wearable devices, desktop computers, mainframes, gaming consoles, or over-the-top content devices such as home theater PCs, or other streaming media devices. As used herein, the term "computing system" includes any device, system, or combination thereof that includes at least one processor, and a physical and tangible computer-readable memory capable of having thereon computer-executable instructions that are executable by the processor. A computing system may be distributed over a network environment and may include multiple constituent computing systems.

A computing system typically includes at least one processing unit and memory. The memory may be physical system memory, which may be volatile, non-volatile, or some combination of the two. The term "memory" may also be used herein to refer to non-volatile mass storage such as physical storage media or physical storage devices. If the computing system is distributed, the processing, memory and/or storage capability may be distributed as well.

As used herein, the term "executable module" or "executable component" can refer to software objects, routines, methods, or similar computer-executable instructions that may be executed on the computing system. The different components, modules, engines, and services described herein may be implemented as objects or processes that execute on the computing system (e.g., as separate threads).

As described herein, a computing system may also contain communication channels that allow the computing system to communicate with other message processors over a wired or wireless network. Such communication channels may include hardware-based receivers, transmitters or transceivers, which are configured to receive data, transmit data or perform both.

Embodiments described herein also include physical computer-readable media for carrying or storing computer-executable instructions and/or data structures. Such computer-readable media can be any available physical media that can be accessed by a general-purpose or special-purpose computing system.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computing system to implement the disclosed functionality of the embodiments described herein. The data structures may include primitive types (e.g. character, double, floating-point), composite types (e.g. array, record, union, etc.), abstract data types (e.g. container, list, set, stack, tree, etc.), hashes, graphs or any other types of data structures.

As used herein, computer-executable instructions comprise instructions and data which, when executed at one or more processors, cause a general-purpose computing system, special-purpose computing system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The embodiments herein may also be practiced in distributed system environments where local and remote computing systems, which are linked (either by hardwired data links, wireless data links, or by a combination of hardwired and wireless data links) through a network, both perform tasks. As such, in a distributed system environment, a computing system may include a plurality of constituent computing systems. In a distributed system environment, program modules may be located in both local and remote memory storage devices.

Those skilled in the art will also appreciate that the embodiments herein may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

Referring now to the figures, FIG. 1 illustrates a computer architecture 100 in which at least one embodiment described herein may be employed. The computer architecture 100 includes a computer system 101. The computer system 101 may be any type of local or distributed computing system, including a cloud computing system. The computer system 101 includes at least one hardware processor 102 and at least some system memory 103. The computer system 101 further includes modules for performing a variety of different functions. For instance, the communications module 104 may be configured to communicate with other computing systems. The communications module 104 may include any wired or wireless communication means that can receive and/or transmit data to or from other computing systems. The communications module 104 may be configured to interact with databases, mobile computing devices (such as mobile phones or tablets), embedded or other types of computing systems.

The computer system 101 also includes a user interface (UI) rendering module or "renderer" 105 that is configured to render a user interface based on information from an information source 113. The information source may be, for example, a web page, an application (such as a mobile application or "app"), or other type of information source. The UI rendering module 105 may render the user interface 116 in a display 115. The UI may include one or more different UI elements 117. These UI elements may include fields, buttons, text boxes, icons or other elements that allow interaction with the user interface. The display 115 may be part of computer system 101, or may be part of a different computer system such as a mobile device (e.g. a smart phone, tablet, laptop, smart watch, etc.). In either case, the UI rendering module 105 may render the UI 116 and supply it to the display 115.

The computer system 101 further includes a natural language input receiver 106 configured to receive natural language inputs 114 from a user. The natural language inputs 114 include an action type and an element description for various UI elements rendered in the UI. The natural language inputs 114 may include any type of spoken word or sound in any language. The natural language inputs are designed to allow a user to speak as they normally would to interact with a user interface. Then, the computer system 101 identifies which UI elements 117 are affected by the user's natural language and implements the determined command.

For example, a user may provide a natural language input 114 to indicate that an application is to be opened. Once opened, the application may provide a UI 116 with various UI elements 117. The user may provide a natural language input 114 to indicate that a certain button or field is to be selected. Indeed, the user's natural language input may include an action type 107 (indicating, for example, that a UI element is to be opened, selected or modified) and an element description 108. The element description may describe the UI element to which it is referring. Thus, in combination, the element description 108 describes which UI element to act on, and the action type 107 indicates which action to take on that UI element.

The computer system 101 further includes an identifying module 109 configured to identify UI elements 117 in the UI 116 that match the element descriptions 108 in the natural language input and are performable according to their specified action type 107. The identifying module 109 of computer system 101 may thus determine, based on the received natural language input 114, which UI elements 117 of the UI 116 are being described by the natural language input. Once the UI elements 110 are identified, the identifying module 109 may determine that the action type 107 specified by the natural language input 114 is performable on that UI element. For example, if the UI element is a button, the action may be selecting that button, or if the UI element is an application icon, the action may be launching the corresponding application.

Once the UI elements 110 have been identified, the natural language mapping module 111 of computer system 101 maps the natural language inputs 114 into executable code 112 using information corresponding to the identified UI elements. The executable code may be designed to implement the action specified in the action type 107. For example, the executable code may be designed to select an application icon to launch an application, or may be designed to select a button to launch a playlist, or select a link in a website to visit the linked website. The executable code 112 may then be associated with the UI 116 so that future natural language inputs directed to that user interface can automatically implement that executable code 112.

Figure 2:
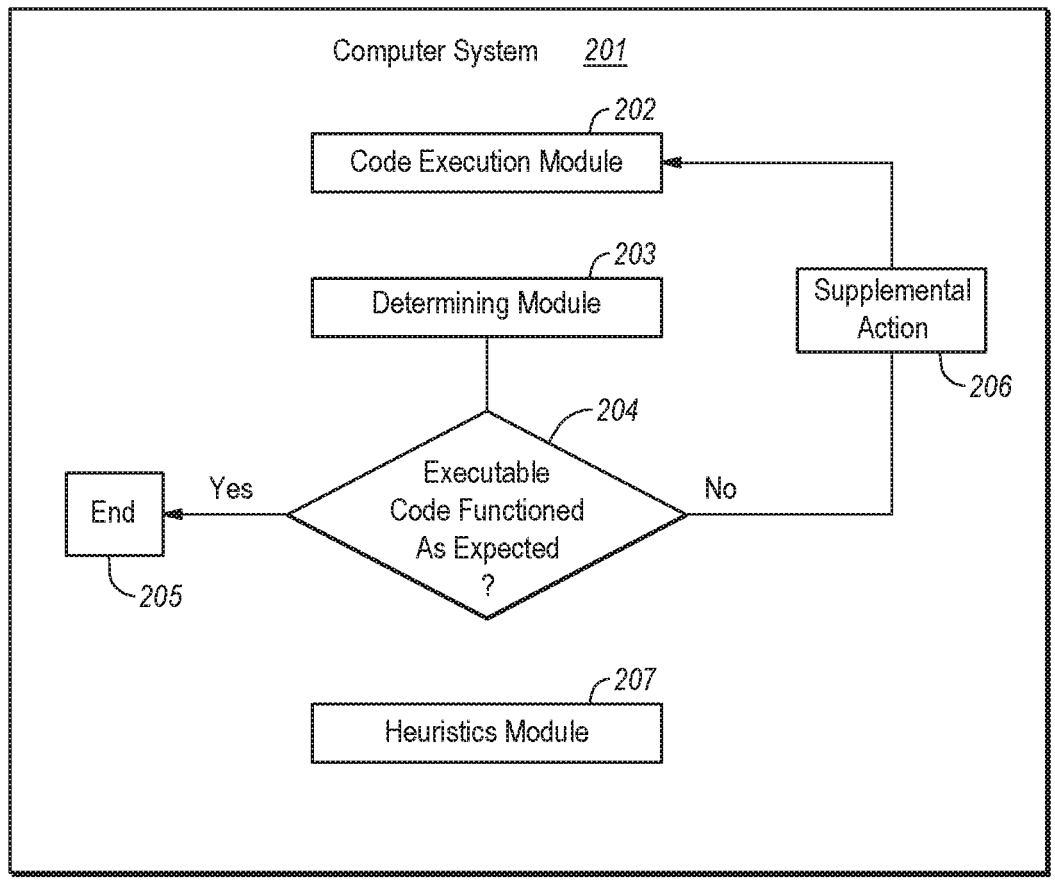
FIG. 2 illustrates an additional computer architecture in which embodiments described herein may operate including executing derived automation instructions.

The executable code 112 may be executed by a code execution module such as a processor. For example, as shown in FIG. 2, the computer system 201 may include a code execution module 202 that executes the code generated by the natural language mapping module 111. Once the code has been executed, the determining module 203 determines whether the executable code functioned as expected 204. If the code executed as expected (yes at 204), then the process ends, and a record is generated indicating that the natural language input 114 mapped to a specific function and portion of executable code.

Alternatively, if the determining module 204 determines that one or more actions performed as a result of executing the executable code 112 did not function as expected (no at 204), then an implementing module may implement at least one secondary, different action 206. The determining module 203 then determines whether the secondary action functioned as expected. If so, a record can be generated indicating that the natural language input 114 mapped to the secondary action. If not, then a third, subsequent action can be implemented, and so on until the expected result is realized. Accordingly, in this manner, natural language inputs 114 may be mapped to executable code that performs the action indicated in the natural language input.

Figure 3:
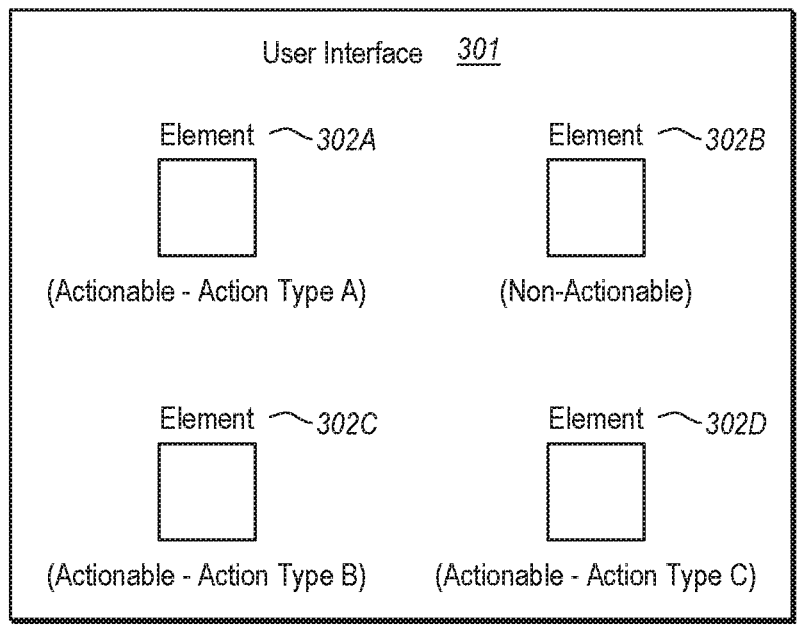
FIG. 3 illustrates an example user interface with user interface elements arranged by action type.

In some embodiments, UI elements may be arranged in a user interface by action type, and may further indicate whether they are actionable elements or not. For example, as shown in FIG. 3, user interface 301 includes four different UI elements. It will be understood that UI 301 may include substantially any number of UI elements, but for illustration purposes, four are shown. The first UI element 302A is an actionable element that is action type A. For example, UI element 302A may be an element that is selected using a tap input. UI element 302B may be a non-actionable UI element, while element 302C is an actionable element of type B.

Figure 4:
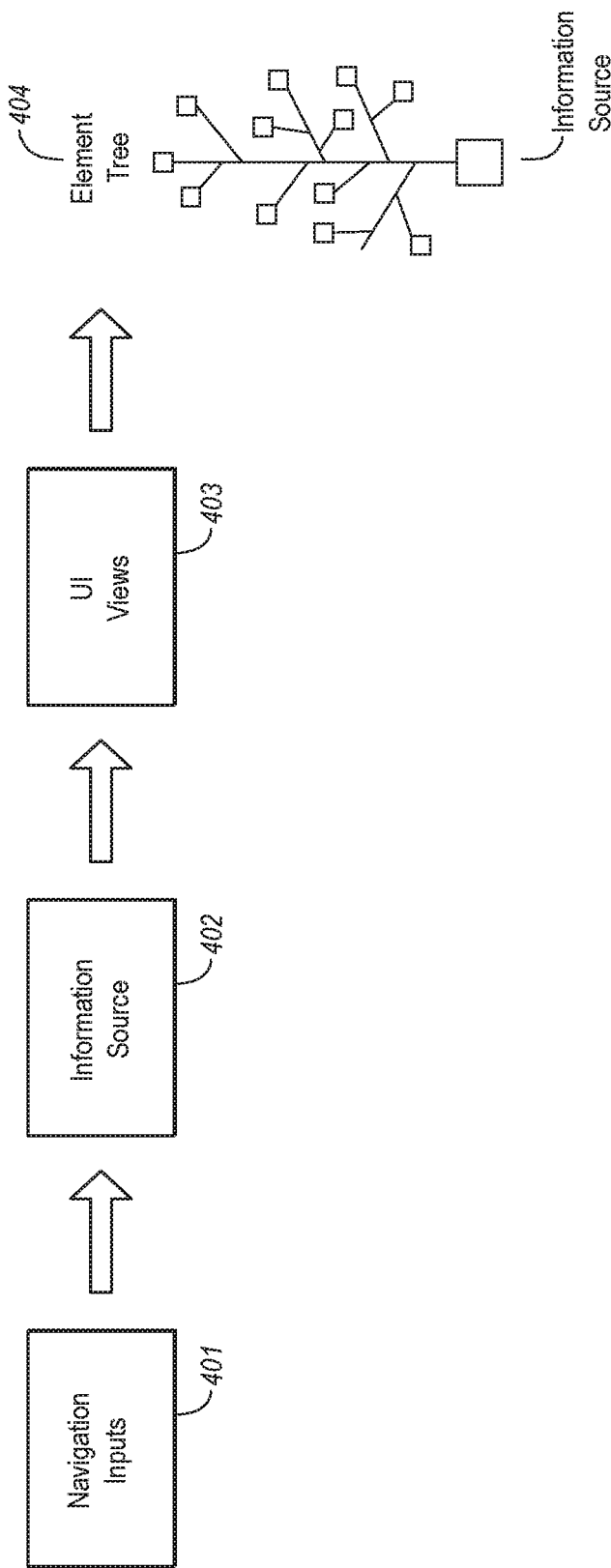
FIG. 4 illustrates an embodiment in which navigation inputs are applied to an information source to generate user interface views and element trees.

For example, UI element 302C may be an element that is selected using a swiping input. Still further, element 302D may be an actionable element that is of action type C, which may indicate that it is activated via a mouse click. Substantially any number or type of UI element or action type may be presented in the UI 301. In some cases, as shown in FIG. 4, natural language inputs may be mapped to an information source such as a web page or application UI, which may in turn be mapped to different UI views 403. These views may be arranged in an element tree that shows the various UI elements of the information source, arranged according to their relationships with each other. These concepts will be explained further below with regard to methods 500 and 600 of FIGS. 5 and 6, respectively.

Figure 5:
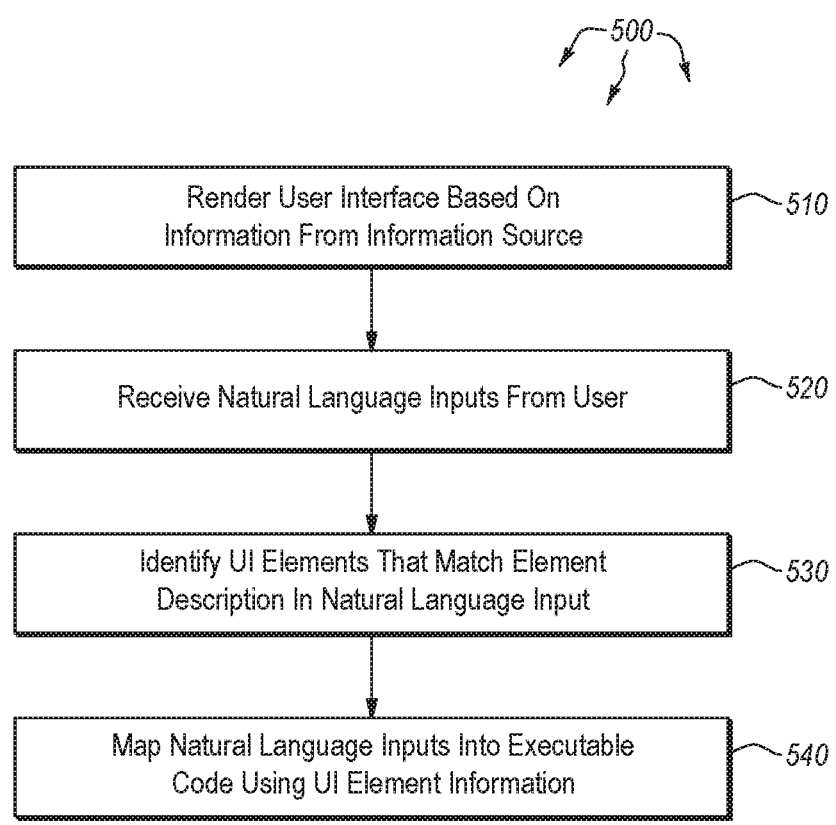
FIG. 5 illustrates a flowchart of an example method for deriving automation instructions.
Figure 6:
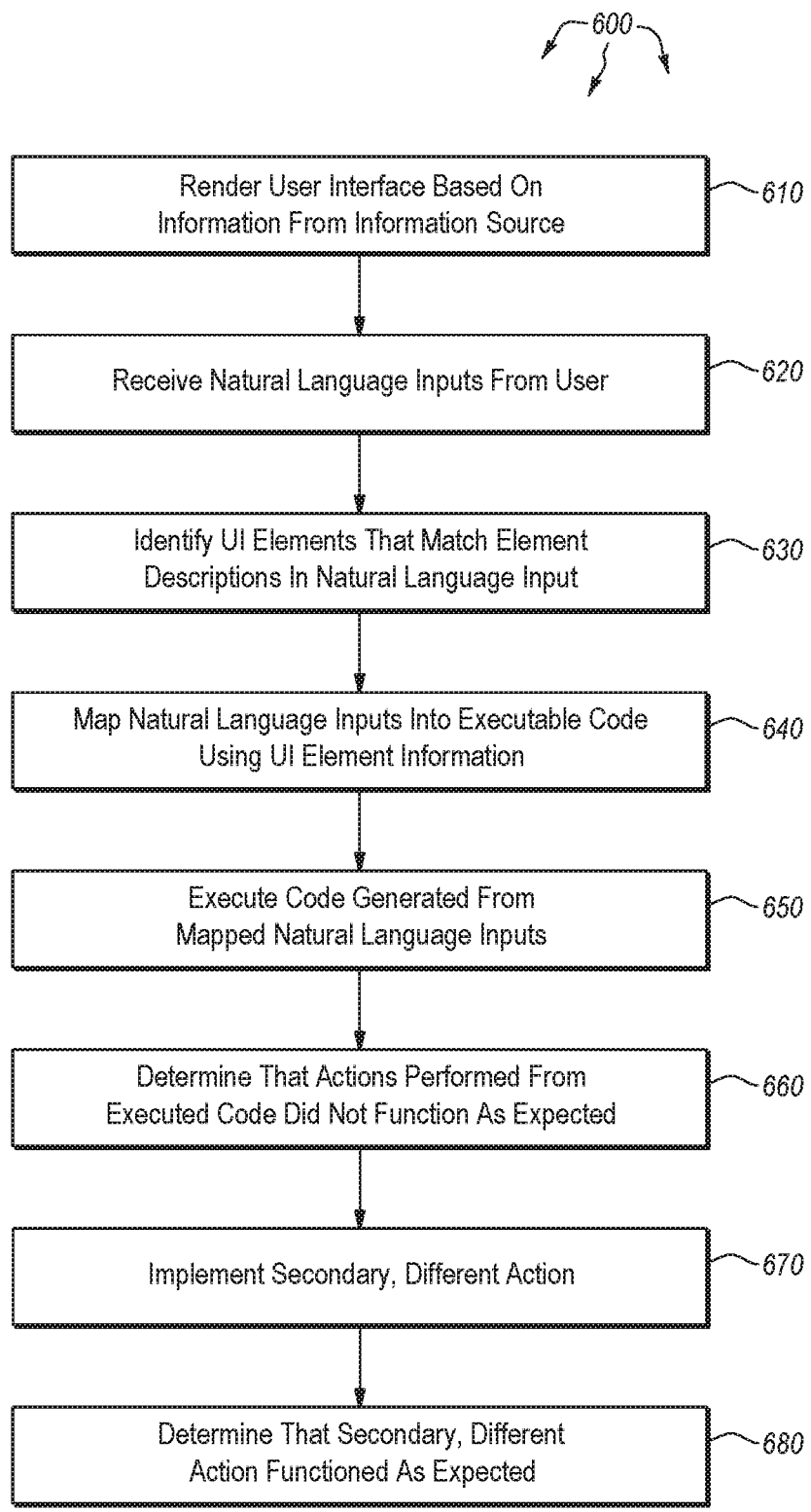
FIG. 6 illustrates a flowchart of an alternative example method for deriving automation instructions.

In view of the systems and architectures described above, methodologies that may be implemented in accordance with the disclosed subject matter will be better appreciated with reference to the flow charts of FIGS. 5 and 6. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 5 illustrates a flowchart of a method 500 for. The method 500 will now be described with frequent reference to the components and data of environment 100 of FIG. 1.

Method 500 includes rendering a user interface (UI) based on information from an information source (510). For example, UI rendering module 105 may render user interface 116 within display 115. The UI may be rendered based on information provided by information source 113. The information source may be a web page, an application screen, or other source of data. The user interface may include multiple different UI elements 117 including buttons, links, slider bars, pictures, videos, text boxes or other UI elements. Each UI element may allow or provide different types of interaction with a user. For instance, some UI elements are actionable, meaning that if selected, an action is performed, while other UI elements are not actionable, meaning that they cannot be selected or, if selected, no action is performed.

Method 500 further includes receiving one or more natural language inputs from a user, wherein the natural language inputs specify an element description and an action type for one or more UI elements rendered in the UI (520). The natural language input receiver 106 of computer system 101 may receive natural language inputs 114 from a user or perhaps from another application. The natural language inputs 114 include words or sounds spoken by a user. The words may have a meaning within a given application or when using a specified operating system. The natural language inputs may not include actual commands where a specified word must be said to enact a certain function; rather, the natural language inputs may include normally spoken words and phrases which are interpreted by the computer system to be a certain command within the application or operating system.

In some cases, the computer system 101 may be configured to determine which natural language inputs invoke which commands within a given user interface. For example, the natural language input "Open my music application" may be mapped to the function of selecting an icon that opens a music application. Once in the music application, the natural language input "Play a song by my favorite artist" may be mapped to the function of selecting a button within the music application that plays a song that has been designated by the user as being a song by a favorite artist. It will be understood that these are merely examples of the many different possible natural language inputs and the effects of those inputs.

In some case, the computer system 101 may not know which UI elements are displayed within a mobile application for example. As such, the computer system 101 may run tests or simulations where natural language inputs are provided to the application UI, and results are monitored. If the results are expected by the computer system, it can be determined that a given natural language input produced a specific result. Such simulations can be performed multiple times in an attempt to map out all of the functionality within a given application or user interface.

As shown in FIG. 4, the natural language inputs (or in some cases navigation inputs) 401 may be applied to the information source 402 in a simulation, for example. The simulation may include applying a plurality of natural language inputs to the information source 402 to determine the results of the inputs. The application of the natural language inputs to the information source 402 may result in different user interface views. A UI view may be a web page (or portion thereof), an application screen or other form of UI view. Thus, in the example above, an operating system may provide a user interface with multiple icons that may be selected to start an application—this would be a UI view 403. Once an application was selected (such as a music application), the first screen shown would be a second UI view.

Once a button within the UI was selected, the UI may again change, resulting in a different UI view. These UI views may be identified within each information source 402, and may be mapped to a collection of elements such as an element tree. For instance, the UI element tree 404 shows the relationships between the UI views, starting at the root information source initial view. Accordingly, as new natural language inputs are applied, and new UI views are discovered, each UI view's relationship to other UI views may be mapped and illustrated in a UI element tree 404.

Returning to FIG. 5, method 500 includes identifying one or more UI elements in the UI that match the element descriptions in the natural language input and whose actions are performable according to their specified action type (530). The identifying module 109 may identify UI elements 110 that match the element descriptions 108 in the natural language input. The identified UI elements 110 have corresponding actions that are performable according to their action type 107. The natural language inputs 114 may specify the action type 107 and element description 108 directly, or may only specify them indirectly, such that the computer system 101 determines the action type and/or element description based on what was said in the natural language inputs 114. The natural language mapping module 111 may then map the natural language inputs 114 into executable code 112 using information that corresponds to the one or more identified UI elements (540).

The executable code 112 that results from the natural language mapping may be designed to perform the function identified by the natural language inputs. Once it is determined which functions are intended from the natural language inputs 114, executable code may be generated that performs those functions. As shown in FIG. 2, the computer system 201 (which may be the same as or different than computer system 101 of FIG. 1) executes the executable code 112 generated from the mapped natural language inputs in its code execution module 202. The determining module 203 can then determine whether actions performed as a result of executing the executable code 112 functioned or did not function as expected. If the actions were as expected (yes at 204), the process ends at 205. If the functions were not as expected (no at 204), the computer system 201 may implement a secondary, different action and determine whether that secondary, different action functioned as expected (204). This process may continue until the accuracy of each natural language input is verified against its expected result.

In some embodiments, a heuristics module 207 may be implemented to determine which actions are most likely to be performed by each natural language input. For example, the heuristics module 207 may determine that a given natural language input 114 is only capable of causing certain actions to be performed (e.g. "close application"), or that a given natural language input typically causes one of only a few things to happen. Over time, the heuristics module 207 may analyze natural language-to-action mappings and may determine, based on past mappings, what a subsequently-received input will do (or is most likely to do) according to a heuristics model.

As mentioned previously, the information source 113 may be a software application, a web page, an operating system view, a document object model (DOM), a mobile application, or other source of data that can be displayed in a UI. Natural language inputs specify actions that are to be taken in relation to the information source 113. For example, the natural language inputs 114 may specify an input directed at an object in a DOM. Once the natural language inputs 114 have been mapped to executable code, that executable code 112 may be repeatedly executed until the natural language input matches a specified expected output. In this manner, natural language inputs may be applied and re-executed until an expected result is achieved. Once the expected result is achieved, the natural language input can be definitively mapped to a desired outcome.

The computer system 101 may be further configured to generate analytics data that indicates how accurately a given set of natural language inputs matched a given set of expected outputs. Thus, if multiple natural language inputs 114 are provided and are tested against a given set of expected outputs, analytics data may be generated to show the results of the testing. The analytics may indicate that some natural language inputs 114 had been properly interpreted to perform a given function, and others had not. The computer system 101 may also be configured to identify, on the information source 113, which UI elements are actionable.

As shown in FIG. 3, different UI elements are actionable, while others are not. In some cases, the actionable UI elements may be identified per action type (e.g. element 302A is action type A). The UI elements may also be recorded in a collection of elements as part of a UI view. Indeed, a collection of elements such as element tree 404 of FIG. 4 may be constructed based on the UI elements 117 in the rendered UI 116. The element tree 404 may show UI elements and their relationships or, alternatively, may show UI views and their relationships, where each UI view includes one or more UI elements 117. Constructing the element tree or other collection of elements may include navigating through the information source by providing multiple navigation inputs 401 to the information source 402, mapping UI views 403 that are generated in response to the navigation inputs, and constructing the element tree 404 with the UI elements based on the mapped UI views.

Turning now to FIG. 6, a flowchart is illustrated of a method 600 for deriving automation instructions. The method 600 will now be described with frequent reference to the components and data of environment 100 of FIG. 1.

Method 600 includes rendering a user interface 116 based on information from an information source 113 (610). The computer system 101 receives natural language inputs 114 from a user (or from another computer system), which include an action type 107 and an element description 108 for UI elements 117 rendered in the UI 116 (620). The identifying module 109 identifies UI elements 110 in the UI 116 that match the element descriptions 108 in the natural language input 114 and are performable according to their specified action type 107 (630).

Method 600 further includes mapping the natural language inputs 114 into executable code 112 using information corresponding to the identified UI elements 110 (640), executing the executable code 112 generated from the mapped natural language inputs (650), determining that various actions performed as a result of executing the executable code 112 executed actions did not function as expected (660), implementing at least one secondary, different action (670), and determining that the secondary, different action functioned as expected (680) (or did not function as expected).

Each UI element may be identified per action type, and may be recorded in a collection of elements such as element tree 404 of FIG. 4. The collection of elements is constructed based on the UI elements in the rendered UI and/or UI views of different web pages or application screens of an application. In some embodiments, the collection of elements is constructed for each UI view 403. These UI views may be linked together via relationships (such as appearing on the same web page or being linked to the same web page, or sharing a link to another page, etc.). When a collection of elements is generated for an information source, it may be displayed by itself, or may be linked together with other element collections.

Thus, in this manner, actionable UI elements may be linked to each other and to natural language inputs. As natural language inputs are provided, they are translated into UI commands that apply to the UI elements of the element collections. The element collection may thus aid in determining how future incoming natural language inputs may be mapped to commands, as the element collection may identify relationships between UI elements and provide an indication of similar elements that may, for example, have the same action type.

Accordingly, methods, systems and computer program products are provided which derive automation instructions. Moreover, methods, systems and computer program products are provided which execute code to determine whether natural language inputs properly map to expected outputs.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A computerized method, performed at a computer system comprising at least one processor, for deriving automation instructions for a user interface (UI) element whose function is not yet mapped, the method comprising:
rendering a user interface (UI) based on information from an information source comprising one or more UI elements, at least one UI element being associated with a function that is considered to be undetermined as a result of not yet being mapped;
receiving one or more natural language inputs from a user, wherein the natural language inputs specify a particular element description and a particular action type for one or more UI elements rendered in the UI;
identifying one or more UI elements in the UI that match the particular element description in the natural language input and whose actions are performable according to the particular action type, wherein identifying the one or more UI elements comprises:
executing a natural-language-input simulation on the information source, wherein executing the natural-language-input simulation comprises:
receiving one or more simulated natural language inputs,
applying the one or more simulated natural language inputs to the at least one UI element in order to determine and map the function of the at least one UI element,
monitoring different UI views generated in response to the applied one or more simulated natural language inputs, and
repeating the natural-language-input simulation multiple times to map out the functionality of multiple UI elements within the information source;
generating a mapping of relationships between one or more UI views, selected from the different UI views, based upon responses of the one or more UI views to the navigation inputs;
constructing the element tree with the one or more UI elements based on the mapping of relationships between the one or more UI views; and
mapping the particular element description and the particular element action type received in the natural language inputs into executable code using information that corresponds to the one or more UI elements.

2. The method as recited in claim 1, further comprising executing the executable code generated from the mapped natural language inputs.

3. The method as recited in claim 2, further comprising:
determining that one or more actions performed as a result of executing the executable code did not function as expected;
implementing at least one secondary, different action; and
determining that the secondary, different action functioned as expected.

4. The method of claim 3, further comprising using heuristics to determine which actions are most likely to be performed for each natural language input.

5. The method of claim 1, wherein the information source comprises at least one of a software application or a web page.

6. The method of claim 5, wherein the natural language inputs specify one or more actions that are to be taken on a software application UI or on a web page interface.

7. The method of claim 6, wherein the executable code is repeatedly executed for a given natural language input until the natural language input matches a specified expected output.

8. The method of claim 7, further comprising generating one or more portions of analytics data that indicates how accurately a given set of natural language inputs matched a given set of expected outputs.

9. A computerized method, performed at a computer system comprising at least one processor, for deriving automation instructions for a user interface (UI) element whose function is not yet mapped, the method comprising:
   rendering a user interface (UI) based on information from an information source comprising one or more UI elements, at least one UI element being associated with a function that is considered to be undetermined as a result of not yet being mapped;
   receiving one or more natural language inputs from a user, wherein the natural language inputs include an action type and a particular element description for one or more UI elements rendered in the UI;
   identifying one or more UI elements in the UI that match the particular element description in the one or more natural language inputs and whose actions are performable according to the particular action type, wherein identifying one or more UI elements comprises:
   executing a natural-language-input simulation on the information source, wherein executing the natural-language-input simulation comprises:
   receiving one or more simulated natural language inputs,
   applying the one or more simulated natural language inputs to the at least one UI element in order to determine and map the function of the at least one UI element,
   monitoring different UI views generated in response to the applied one or more simulated natural language inputs, and
   repeating the natural-language-input simulation multiple times to map out the functionality of multiple UI elements within the information source;
   generating a mapping of relationships between one or more UI views, selected from the different UI views, based upon responses of the one or more UI views to the navigation inputs;
   mapping the particular element description and the particular element action type received in the natural language inputs into executable code using information corresponding to the one or more UI elements;
   executing the executable code generated from the mapped natural language inputs;
   determining that one or more actions performed as a result of executing the executable code executed actions did not function as expected;
   implementing at least one secondary, different action; and
   determining that the secondary, different action functioned as expected.

10. The method of claim 9, wherein the natural language inputs are translated into UI commands that apply to UI views of the information source.

11. The method of claim 10, wherein the translation of natural language inputs into UI commands occurs in an emulator.

12. A computer system comprising:
   one or more processors;
   a renderer configured to render a user interface (UI) based on information from an information source, comprising one or more UI elements, at least one UI element being associated with a function that is considered undetermined as a result of not yet being mapped;
   a natural language input receiver configured to receive one or more natural language inputs from a user, wherein the natural language inputs include an action type and a particular element description for one or more UI elements rendered in the UI;
   an identifying module configured to identify one or more UI elements in the UI that match the particular element description in the natural language input and are performable according to their specified action type, wherein identifying one or more UI elements comprises:
   executing a natural-language-input simulation on the information source, wherein executing the natural-language-input simulation comprises:
   receiving one or more simulated natural language inputs,
   applying the one or more simulated natural language inputs to the at least one UI element in order to determine and map the function of the at least one UI element,
   monitoring different UI views generated in response to the applied one or more simulated natural language inputs, and
   repeating the natural-language-input simulation multiple times to map out the functionality of multiple UI elements within the information source;
   generating a mapping of relationships between one or more UI views, selected from the different UI views, based upon responses of the one or more UI views to the navigation inputs; and
   constructing the element tree with the one or more UI elements based on the mapping of relationships between the one or more UI views; and
   a natural language mapping module configured to map the particular element description and the particular element action type received in the natural language inputs into executable code using information corresponding to the one or more UI elements.

13. The computer system of claim 12, wherein the one or more processors execute the executable code generated from the mapped natural language inputs.

14. The computer system of claim 12, further comprising:
   a determining module configured to determine that one or more actions performed as a result of executing the executable code did not function as expected; and
   an implementing module configured to implement at least one secondary, different action, wherein the determining module determines that that the secondary, different action functioned as expected.

* * * * *